June 6, 1944.   V. R. KIMBALL   2,350,769
CAGING MEANS FOR GYROSCOPES
Filed April 8, 1942   5 Sheets-Sheet 5

INVENTOR.
V. R. KIMBALL.
BY
ATTORNEY.

Patented June 6, 1944

2,350,769

UNITED STATES PATENT OFFICE 2,350,769

CAGING MEANS FOR GYROSCOPES

Vernon R. Kimball, Maywood, N. J., assignor to Bendix Aviation Corporation, Bendix, N. J., a corporation of Delaware Application April 8, 1942, Serial No. 438,200

18 Claims. (Cl. 74—5)

This invention relates to gyroscopic devices and more particularly to novel apparatus for caging and centralizing such devices.

The disadvantages encountered with the use of known apparatus provided for this purpose have been that for any great deviation from normal of either the gyro rotor spin axis or the rotor mounting gimbal, caging was impossible because the operating mechanism thereof was carried by some part of the housing enclosing the gyroscope and the pilot had to perform some intermediate step to return either the rotor or its mounting gimbal into the operating sphere of the caging apparatus.

The present invention contemplates the provision of a novel caging and centralizing apparatus which accomplishes its purpose and function at all times notwithstanding the position of the rotor or its mounting gimbal.

An object of the present invention, therefore, is to provide a novel caging, centralizing and locking apparatus for gyroscopic devices, such as, artificial horizons, gyro verticals, etc.

A further object of the invention is to provide a novel caging apparatus for gyroscopic devices which operates in sequence or a timed cycle to first cage and centralize the rotor mounting means and thereafter to cage and centralize the gyro rotor.

Another object of the invention is to provide a gyroscopic horizon, or the like, with novel caging means which are adapted to cage and centralize the gyroscope about one axis and, subsequently, to cage and centralize the gyroscope about another axis.

A further object of the invention is to provide a novel caging and centralizing apparatus for gyroscopic devices which is operable at all times to cage and centralize the gyroscope whether it be running or at rest.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts, throughout the several views, Figure 1 is a front elevation view of one form of gyroscopic device provided with the novel means of the present invention;

Figure 1:
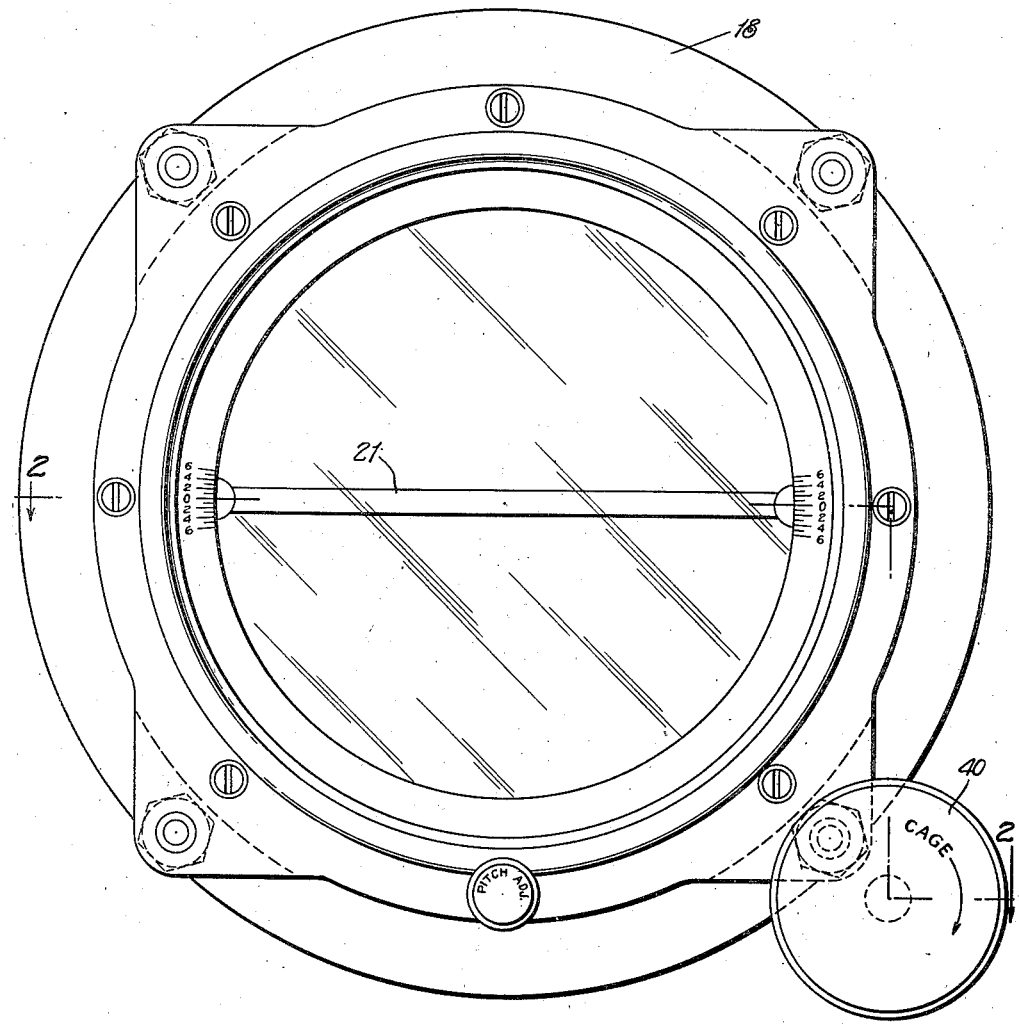

The novel apparatus of the present invention is illustrated as applied to an artificial horizon gyro having a rotor, which may be driven either pneumatically or electrically, mounted within a casing 10 for spinning about a normally vertical axis. The rotor casing is mounted for oscillation about a horizontal axis within a gimbal mounting ring 11 by way of suitable trunnions supported in bearings 12 and 13 (Fig. 2) carried by gimbal 11. The gimbal, in turn, is mounted for oscillation about a second horizontal axis by way of outer trunnions 14 and 15 rotatably mounted within bearings 16 and 17 supported within a mechanism casing 18. The gyro rotor is thus provided with three degrees of freedom and the instrument, when mounted on a craft, has its outer gimbal trunnions 14, 15 arranged parallel to the longitudinal craft axis and the inner trunnions parallel with the craft's transverse axis.

Mechanism casing 18 is normally enclosed within an instrument housing (not shown) for mounting on the craft's instrument panel. The front end of the casing is sealed air-tight by way of a cover glass 19, through which may be observed a mask 20, carried for movement with the outer gimbal trunnions, and a horizon bar 21, mounted for up and down movement relative to the mask in accordance with rotor oscillation about the inner trunnions. The foregoing elements are well known to the art and, therefore, have been described only generally, since, of themselves, they constitute no part of the present invention.

Figure 2:
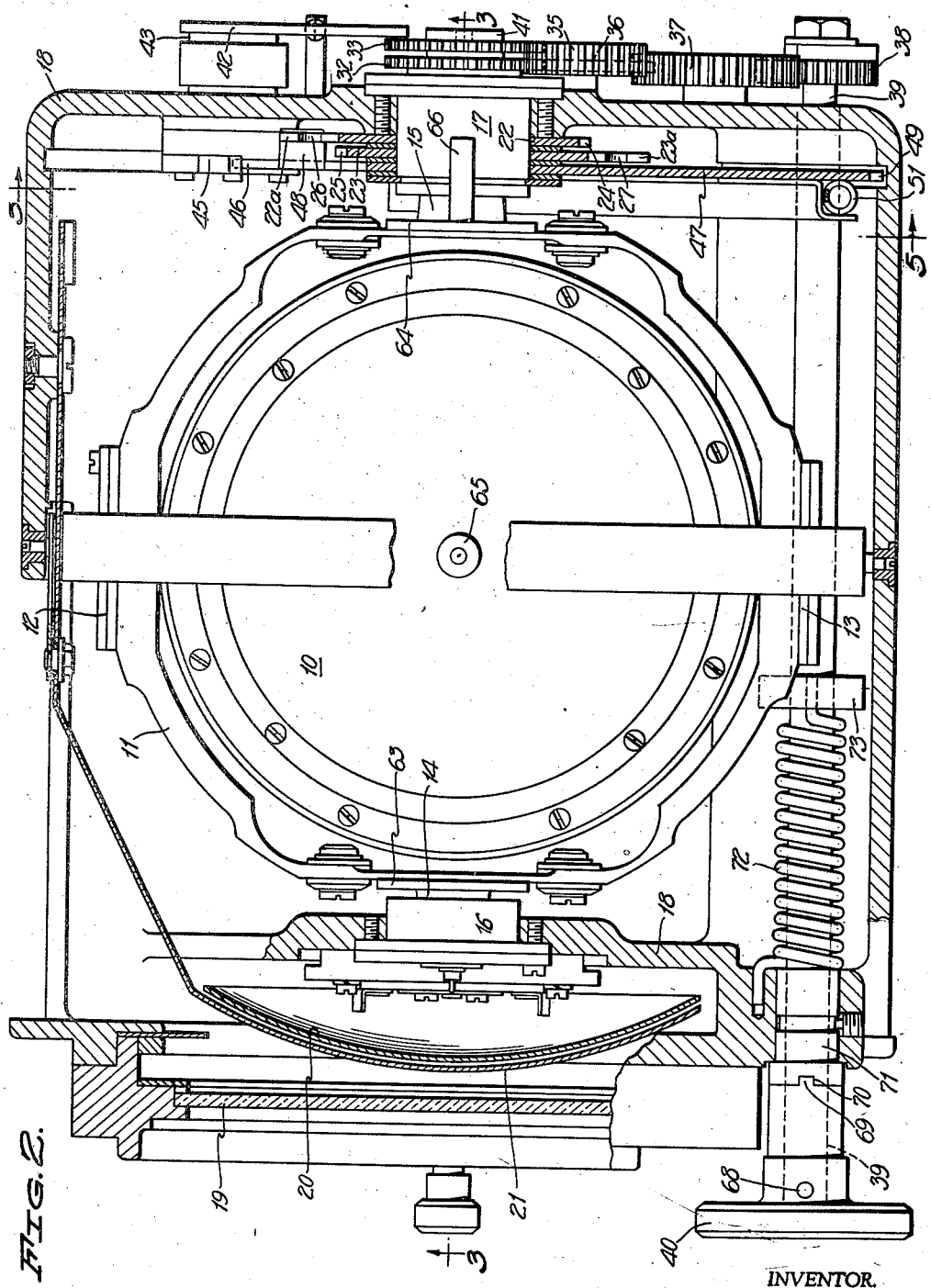
Figure 2 is a longitudinal section view taken substantially along line 2—2 of Figure 1.
Figure 5:
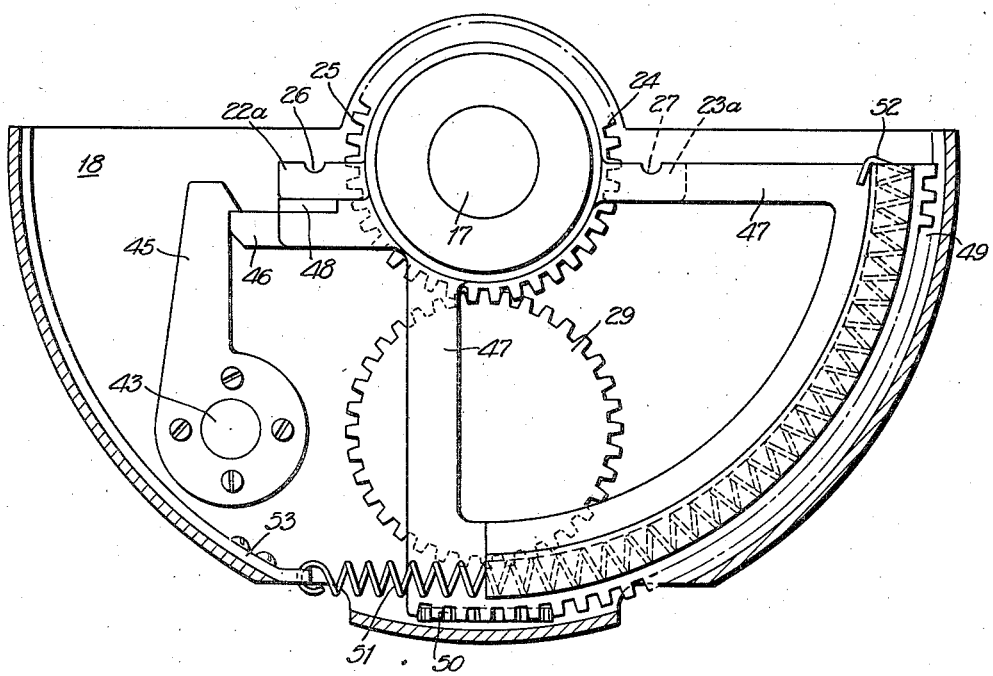
Figure 5 is a view in section taken substantially along line 5—5 of Figure 2; and, Figure 6 is a fragmentary view illustrating a portion of the novel caging mechanism.

Coming now to the novel caging and centralizing apparatus of the present invention, reference is made to Figures 2 and 5, wherein are shown, mounted about bearing 17, a pair of concentrically arranged arms 22a and 23a formed integrally with two sectors 22 and 23 having toothed peripheries 24 and 25, respectively. These arms are provided with recesses 26 and 27, for a purpose to presently appear and are normally separated substantially 180° apart, as shown in Figs. 2 and 5, arm 22a of sector arm 22, only, being visible in the latter figure.

Figure 3:
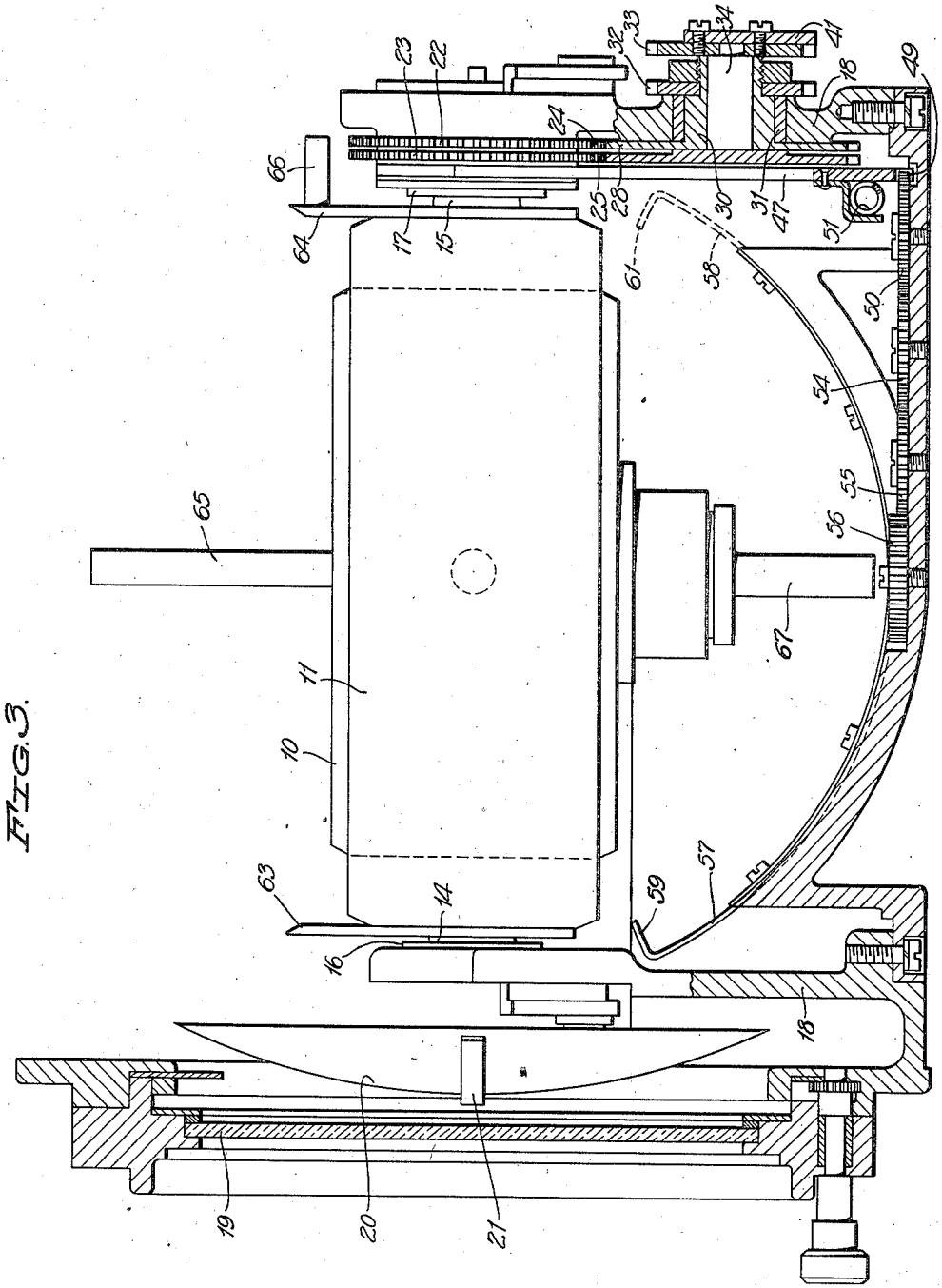
Figure 3 is a view in section taken substantially along line 3—3 of Figure 2.

Referring now in Figure 3, sectors 22 and 23 engage at their outer toothed peripheries 24 and 25 with two concentrically mounted and oppositely rotatable gears 28 and 29. Inner gear 28, engaging toothed portion 24 of sector 22, is carried by a hollow shaft 30 journalled at its outer periphery within a bearing 31 carried by casing 18. The outer end of shaft 30 has secured thereto a gear 32 mounted concentrically with an outer gear 33 secured to a shaft 34 about which is sleeved shaft 30. The inner end of shaft 34 carries the outer gear 29 which engages toothed portion 25 of sector 23.

Figure 4:
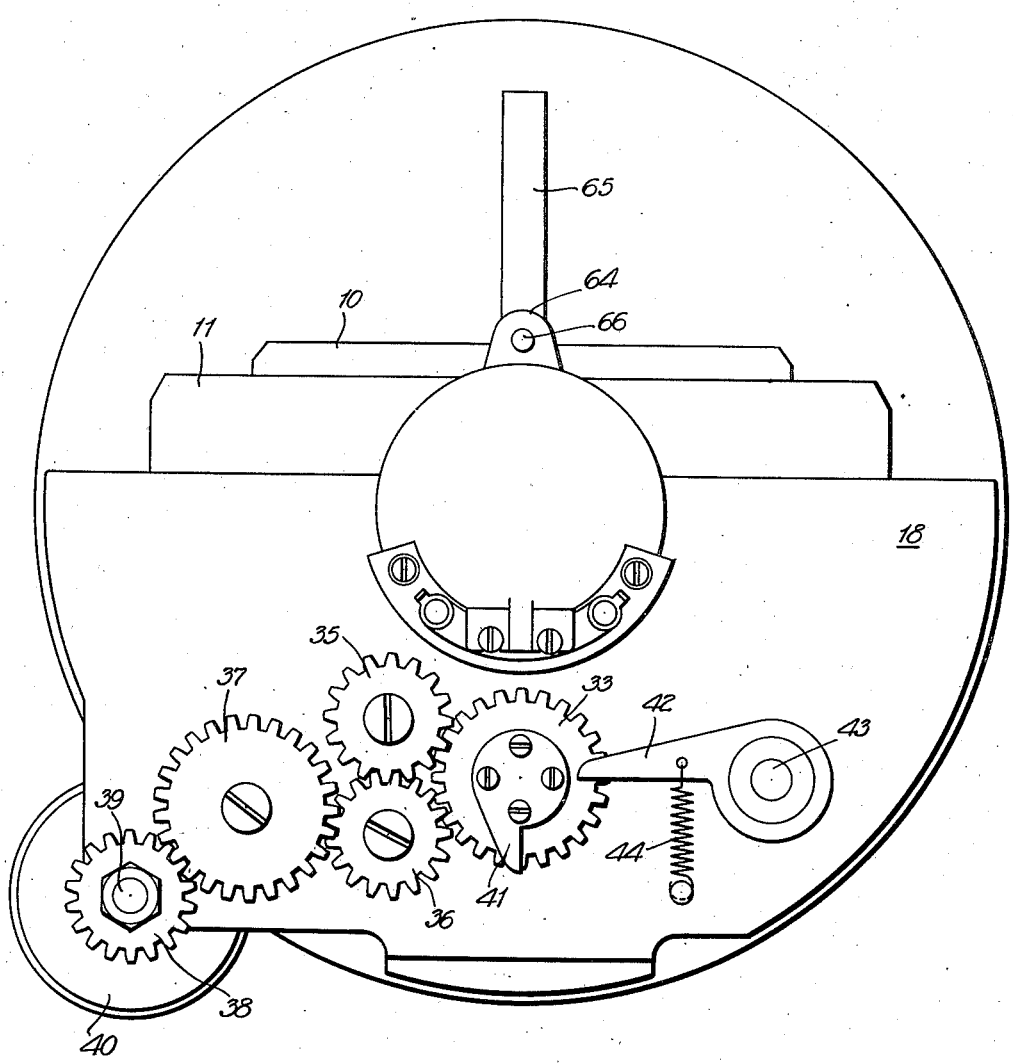
Figure 4 is a rear elevation view of the device of Figure 1.

As more clearly illustrated in Figures 2 and 4, outer gear 33 is engaged by a gear 35 while, it, in turn, is in mesh with and driven by a further and relatively thinner gear 36. Gear 36 does not engage gear 33 but meshes only with inner gear 32 and is driven by an idler gear 37 meshing with a gear 38, which is secured to and rotatable with a cage shaft 39 operable by means of a suitable cage knob 40 arranged at the face of the instrument (Fig. 1).

Mounted upon outer gear 33, furthermore, is a trip finger 41, which after a predetermined amount of rotation of gear 33 engages and lifts a lever arm 42 secured to a shaft 43 carried by casing 18. A suitable spring 44 anchored at one end to casing 18 normally urges lever arm 42 to the position shown in Figure 4.

At the interior of casing 18, shaft 43 has secured thereto a latch arm 45 normally holding a finger 46 in the position shown in Figure 5. Finger 46 is formed integrally with a large sector element 47, which, like arm sectors 22 and 23, is pivotally mounted about bearing 17. Adjacent finger 46, furthermore, sector 47 is provided with an abutment 48 which is resiliently held against the base of arm 22a of sector 22.

The outer periphery of sector 47 is toothed at 49, as shown in Figure 5, to engage a gear 50 (Fig. 6) mounted at the base of casing 18 for reasons to presently appear. A large coil spring 51 is anchored to the top of sector 47, as at 52, and at its free end to the interior of casing 18 by means of a plate 53 whereby upon release of finger 46 by latch arm 45, spring 51 swings sector 47 downwardly and to the left as viewed in Figure 5.

Figure 6:
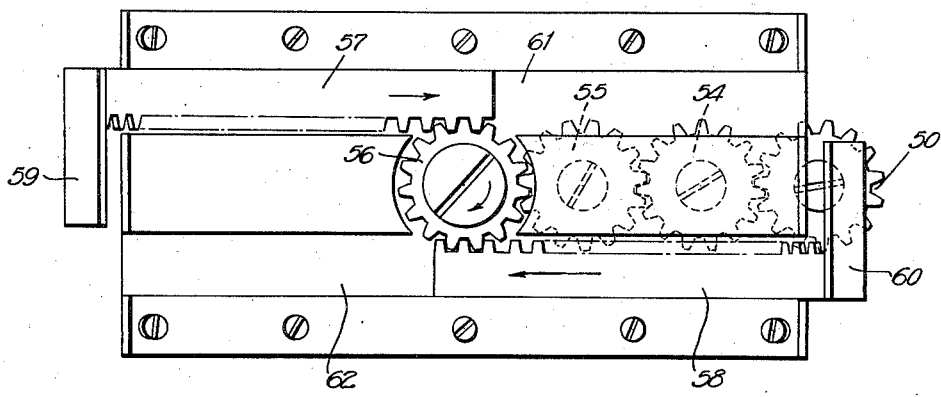

The toothed portion 49 of sector 47 engages and rotates the gear 50 which, through gears 54 and 55 engages with a gear 56, as more clearly shown in Figure 6. Gear 56, on the other hand, engages with two oppositely movable toothed rack sectors 57 and 58 carrying at their outer ends fingers or arms 59, 60, respectively. In their normal and inoperative position these racks are in the position shown in Figure 3, however, upon rotation of gear 56, the racks move in opposite directions within suitable guide supports 61 and 62, fastened to the base of casing 18, until such time as fingers or arms 59 and 60 meet in a substantially common plane at the central axis of gear 56.

Gimbal ring 11 is provided, for movement therewith, about its outer trunnions 14 and 15, with plates or limit stop members 63 and 64 whose facing ends are tapered slightly so that upon precession of rotor casing 10 about the inner trunnion axis, that is, about an axis perpendicular to the axis of trunnions 14, and 15, due to a precessing force applied at the outer trunnions, the rotor casing spindle 65, housing the rotor spin axle, engages either one of limit stops 63 or 64, thereby dissipating the reactive force applied to the outer trunnions due to rotor precession.

A pin 66 is fastened to the outer face of limit stop member 64 and extends outwardly over sector arms 22a and 23a so that gimbal 11 may oscillate substantially 180° about outer trunnions 14, 15 before pin 66 engages arm recesses 26 or 27, when the arms are in their inoperative or spread position.

The lower end of rotor casing 10, like its upper end, is provided with a spindle 67 encasing the rotor spin axle and is so arranged that, notwithstanding its position within substantially 180° about the inner trunnions, either of fingers or arms 59 or 60 may engage spindle 67 and return it to its normally vertical position.

When the pilot desires to centralize and lock the gyro, just prior to any maneuver or for some other reason, he merely grasps knob 40, which is secured to cage shaft 39 by way of a pin 68, and pulls it outwardly until a finger 69 is withdrawn from a cooperating recess 70 formed in a stationary bushing 71 supported within a portion of casing 18, to place the shaft under the influence of an initially torsionally and compressionally loaded spring 72 anchored to casing 18 at one end, and to a stud member 73, fastened to the shaft at its other end. This spring, therefore, initates rotation of cage shaft 39 and its gear 38.

As more clearly shown in Figures 2 and 4, gear 38 rotates idler 37 which, in turn, rotates gear 36, which, being in engagement with gear 32, rotates the latter in one direction. Gear 36 also engages thicker gear 35 to rotate it in the same direction. Gear 33 is rotated from gear 35 and its direction, as will appear, is opposite to the rotation of gear 32 engaged by gear 36.

In Figure 3, it is seen that oppositely rotating gears 32, 33 rotate gears 28 and 29 in opposite directions which, in turn, rotate arm sectors 22 and 23 in opposite directions thereby moving arms 22a and 23a toward each other in the nature of a scissor action. Notwithstanding the angular amount that gimbal 11 may have oscillated about trunnions 14, 15, either one of arms 22a or 23a will engage pin 66 at their recesses 26 or 27.

As is well known in the operation of gyroscopes, the moment that either arm 22a or 23a engages pin 66, the gyro rotor is caused to precess about the inner trunnions and, in doing so, provides a reactive torque on the engaging arm to oppose the rotation of cage shaft 39 under the action of spring 72. The rotor casing 10 moves angularly about the inner trunnions until spindle 65 engages limit stop 63 or 64 and, at the moment of engagement, the reactive force on the engaging arm is dissipated and movement of arms 22a and 23a continues until pin 66 and thus gimbal 11 are returned to the normally horizontal position shown in Figure 3. Gimbal 11 is now centered, caged and locked.

With the locking of gimbal 11, gear 33 (Fig. 4) has rotated sufficiently to cause trip pin 41 to engage and move lever arm 42 in a clockwise direction against the action of spring 44. Movement of lever arm 42 moves latch arm 45 to the left (Fig. 5) until finger 46 of sector 47 is disengaged. Sector 47 now is placed under the full action of the force of spring 51 and is, therefore, swung to the left as viewed in Figure 5. The toothed portion 49 of sector 47 rotates gears 50, 54, 55 and 56. Upon rotating, gear 56 moves rack sectors 57 and 58 in opposite directions and wherever spindle 67 may be, either of fingers or arms 59 or 60 will engage the spindle and, upon continued movement, return it to its normally vertical position. At this point the gyro is completely caged and locked and preserved from any possible damage during violent craft maneuvers.

To uncage the gyro the reverse of the above procedure takes place. Knob 40 (Fig. 1) is turned in a counterclockwise direction and pushed inwardly when finger 69 is opposite recess 70. By thus turning the knob the cage shaft is rotated in an opposite direction to again torsionally load spring 72 and at the same time reverse the rotation of the previously described gear train. With the reverse rotation of gears 32 and 33 (Fig. 4) pin 41 moves away from lever arm 42 which, by virtue of spring 44, is returned to its normal position and, likewise, moves latch arm 45 to the position of Figure 5.

Upon continued rotation of gears 32 and 33, arms 22a and 23a are moved outwardly and away from each other, disengaging pin 66 and thereby unlocking gimbal 11. During outward movement of arm 22a, abutment 48 carried by sector 47 has been engaged with the base of the arm so that sector 47 is returned in a counter-clockwise direction (Fig. 5) to reverse rotation of gears 50, 54, 55, and 56, as well as move racks 57, 58 outwardly, and simultaneously load coil spring 51. Fingers 59 and 60 thus release spindle 67 and unlock the gyro about its inner trunnions substantially simultaneously with the release of pin 66 by arms 22a and 23a. Arm 22a, by moving abutment 48, urges finger 46 downwardly until it is engaged and locked by latch arm 45 thereby placing the whole apparatus in condition for a subsequent caging operation.

In view of the foregoing it is believed to be apparent to those skilled in the art of caging gyroscopic devices that a new and novel apparatus has been provided for caging and centralizing artificial horizons, gyro verticals, or the like, wherein the caging operation is performed in sequence or a timed cycle consisting of two major steps, one being the centralizing and locking of the gyro rotor mounting means and the other being the centralizing and locking of the gyro rotor about its second axis of oscillation, the latter step being effected only after the first step has been completed.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

What is claimed is:

1. A caging and centralizing device for gyroscopic devices comprising the combination with a gyro rotor provided with a casing and adapted for spinning about one axis and supporting means including a gimbal for mounting said rotor for freedom about two mutually perpendicular axes other than said spin axis, of a member carried by and projecting from said gimbal, a second member projecting from said rotor casing, a plurality of arms pivoted about said first member, a plurality of arms mounted to engage said second member, and means for actuating said first-named arms to engage said first member and subsequently actuating said second-named arms to engage said second member.

2. A caging and centralizing device for gyroscopic devices comprising the combination with a gyro rotor provided with a casing and adapted for spinning about one axis and supporting means including a gimbal for mounting said rotor for freedom about two mutually perpendicular axes other than said spin axis, of a member projecting from said gimbal, a second member projecting from said rotor casing, a plurality of arms pivoted about said first member, a plurality of arms mounted about said second member, means connecting said second-named arms with said first-named arms for sequential operation, and means for actuating said first-named arms to engage said first member and thereafter actuating said second-named arms to engage said second member.

3. A caging device for artificial horizons comprising the combination with a gyro rotor provided with a casing and having normally vertical spin axis and supporting means including a gimbal for mounting said rotor for freedom about two mutually perpendicular horizontal axes, of a pin carried by and projecting from said gimbal, a second pin projecting from said rotor casing, a plurality of arms pivotally mounted about said first pin, a plurality of arms mounted about said second pin, and actuating means for turning said first-named arms to engage said first pin and subsequently operating said second-named arms to engage said second pin.

4. A caging device for artificial horizons comprising the combination with a gyro rotor provided with a casing and having normally vertical spin axis and supporting means including a gimbal for mounting said rotor for freedom about two mutually perpendicular horizontal axes, of a pin projecting from said gimbal, a second pin projecting from said rotor casing, a plurality of arms pivoted about said first pin, a plurality of arms mounted about said second pin, means interconnecting said second-named arms with said first-named arms for sequential operation, and means for actuating said first-named arms to engage said first pin and thereafter actuating said second-named arms to engage said second pin.

5. A caging device for artificial horizons comprising the combination with a gyro rotor provided with a casing and having normally vertical spin axis and supporting means including a gimbal for mounting said rotor for freedom about two mutually perpendicular horizontal axes, of a member carried by said gimbal and projecting therefrom, a second member projecting from said rotor casing, a plurality of arms pivoted about said first member, a plurality of arms mounted about said second member, means connecting said second-named arms with said first-named arms for sequential operation, and means for actuating said first-named arms to engage said first member and cage said gimbal and thereafter operating said second-named arms to engage said second member and cage said gyro rotor.

6. A caging and centralizing device for gyroscopic devices comprising the combination with a gyro rotor provided with a casing and adapted for spinning about one axis and supporting means including a gimbal for mounting said rotor for freedom about two mutually perpendicular axes other than said spin axis, of a pin projecting from said gimbal, a second pin projecting from said rotor casing, a plurality of arms pivoted about said first pin, a plurality of arms mounted about said second pin, means connecting said second-named arms with said first-named arms for sequential operation, and means for actuating said first-named arms to engage said first pin and operating said connecting means to thereafter actuate said second-named arms to engage said second pin.

7. A caging device for artificial horizons comprising the combination with a gyro rotor provided with a casing and having normally vertical spin axis and means including a gimbal for mounting said rotor for freedom about two mutually perpendicular axes other than said spin axis, of means for caging said gimbal, a pin projecting from said rotor casing, a plurality of engaging members mounted about said pin, means connecting said caging means and said engaging members for sequential operation, and means for operating said caging means to cage said gimbal and for simultaneously operating said connecting means to thereafter actuate said engaging members to engage said pin.

8. A caging device for artificial horizons comprising the combination with a gyro rotor provided with a rotor casing and having normally vertical spin axis and means including a gimbal for mounting said rotor for freedom about two mutually perpendicular axes, of means for caging said gimbal, a pin projecting from said rotor casing, a plurality of engaging members mounted about said pin, means connecting said members with said caging means including a latching device holding said members in an inoperative position during the initial operation of said caging means, and means for actuating said caging means to cage said gimbal and thereafter to release said latching device to actuate said members to engage said pin.

9. A caging device for artificial horizons comprising the combination with a gyro rotor provided with a rotor casing and having normally vertical spin axis and means including a gimbal for mounting said rotor for freedom about two mutually perpendicular axes, of means for caging said gimbal, a pin projecting from said rotor casing, a pair of oppositively movable engaging members mounted about said pin, means connecting said engaging members with said caging means and comprising a latching device for holding said members against movement during the initial operation of said caging means, and means operative for actuating said caging means to cage said gimbal and thereafter for releasing said latching device to operate said members to engage said pin.

10. A caging device for artificial horizons comprising the combination with a gyro rotor provided with a rotor casing and having normally vertical spin axis and means including a gimbal for mounting said rotor for freedom about two mutually perpendicular axes, of means for caging said gimbal, a pin projecting from said rotor casing, a pair of oppositively movable engaging members mounted about said pin, means connecting said members with said caging means and including a latching device for holding said members against movement during the initial operation of said caging means, said latching device comprising a resiliently constrained member for operating said engaging members and a pivoted lever for holding said constrained member in a predetermined and inoperative position, and means operative for actuating said caging means to cage said gimbal and thereafter for turning said lever to release said constrained member to move said engaging members to engage said pin.

11. A caging device for artificial horizons comprising the combination with a gyro rotor having normally vertical spin axis and supporting means including a gimbal for mounting said rotor for freedom about two mutually perpendicular axes, of a pin carried by and projecting from said gimbal, a plurality of arms pivoted about said pin, means for caging and centralizing said rotor, means connecting said caging means and said arms and including a latch device for maintaining said rotor caging means inoperative during the initial operation of said arms, said latching device comprising a resiliently constrained member for operating said caging means and a pivoted lever for holding said constrained member in a predetermined and inoperative position, and means for turning said arms to engage said pin and thereafter for turning said lever to release said constrained member to operate said rotor caging means.

12. A caging and centralizing device for gyroscopic devices comprising the combination with a gyro rotor adapted for spinning about one axis and means including a gimbal for mounting said rotor for freedom about two mutually perpendicular axes other than said spin axis, of means for caging said gimbal, means for caging said rotor, means connecting said last-named caging means to said first-named caging means for sequential operation, and means for operating said first-named caging means and thereafter said last-named caging means.

13. A caging and centralizing device for artificial horizons comprising the combination with a gyro rotor having normally vertical spin axis and supporting means including a gimbal for mounting said rotor for freedom about two mutually perpendicular horizontal axes other than said spin axis, of caging means for said gimbal, other caging means for said rotor, means connecting said gimbal caging means and said rotor caging means for sequential operation, and means for operating said gimbal caging means and thereafter for operating said rotor caging means.

14. A caging and centralizing device for artificial horizons comprising the combination with a gyro rotor having normally vertical spin axis and means including a gimbal for mounting said rotor for freedom about two mutually perpendicular horizontal axes, caging means for said gimbal, other caging means for said rotor, means connecting said rotor caging means to said first-named caging means and including a latching mechanism holding said rotor caging means in an inoperative position during the initial operation of said first-named caging means, and means for actuating said first-named caging means and thereafter to release said latching mechanism to actuate said rotor caging means.

15. A caging and centralizing device for artificial horizons comprising the combination with a gyro rotor having normally vertical spin axis and means including a gimbal ring for mounting said rotor for freedom about two mutually perpendicular horizontal axes, caging means for said gimbal ring, caging means for said rotor, means connecting said rotor caging means to said first-named caging means and including a latching device holding said rotor caging means in an inoperative position during the initial operation of said first-named caging means, said latching device comprising a resiliently constrained member for operating said rotor caging means and a pivoted lever for holding said constrained member in a predetermined and inoperative position, and means for actuating said first-named caging means and thereafter for turning said lever to release said constrained member and actuate said rotor caging means.

16. In a caging and centralizing device for universally mounted gyroscopes, the combination with the gyroscope, of means for caging and locking said gyroscope about one axis thereof, means for caging and locking said gyroscope about a second axis thereof at right angles to said first axis, and means for sequentially operating said first and second means.

17. In a gyro-vertical, an outer casing therefor, a gyroscope universally mounted in said casing on two mutually perpendicular horizontal axes with the spin axis vertical, and means for sequentially caging and locking said gyroscope first about one of said horizontal axes and then about the other, whereby said gyroscope becomes locked with its spin axis mutually perpendicular to said two horizontal axes.

18. A caging and centralizing device for gyroscopic devices comprising the combination with a gyro rotor adapted for spinning about one axis and means including a gimbal for mounting said rotor for freedom about two mutually perpendicular axes other than said spin axis, of means for caging and locking said rotor about one of said two mutually perpendicular axes, means for caging and locking said rotor about the other of said two mutually perpendicular axes, and means for sequentially operating said first and second means.

VERNON R. KIMBALL.